Dec. 11, 1951  L. SAIVES  2,578,454
DRILLING AND SWARF CLEARING DEVICE FOR MACHINE TOOLS
Filed Jan. 6, 1948  2 SHEETS—SHEET 1
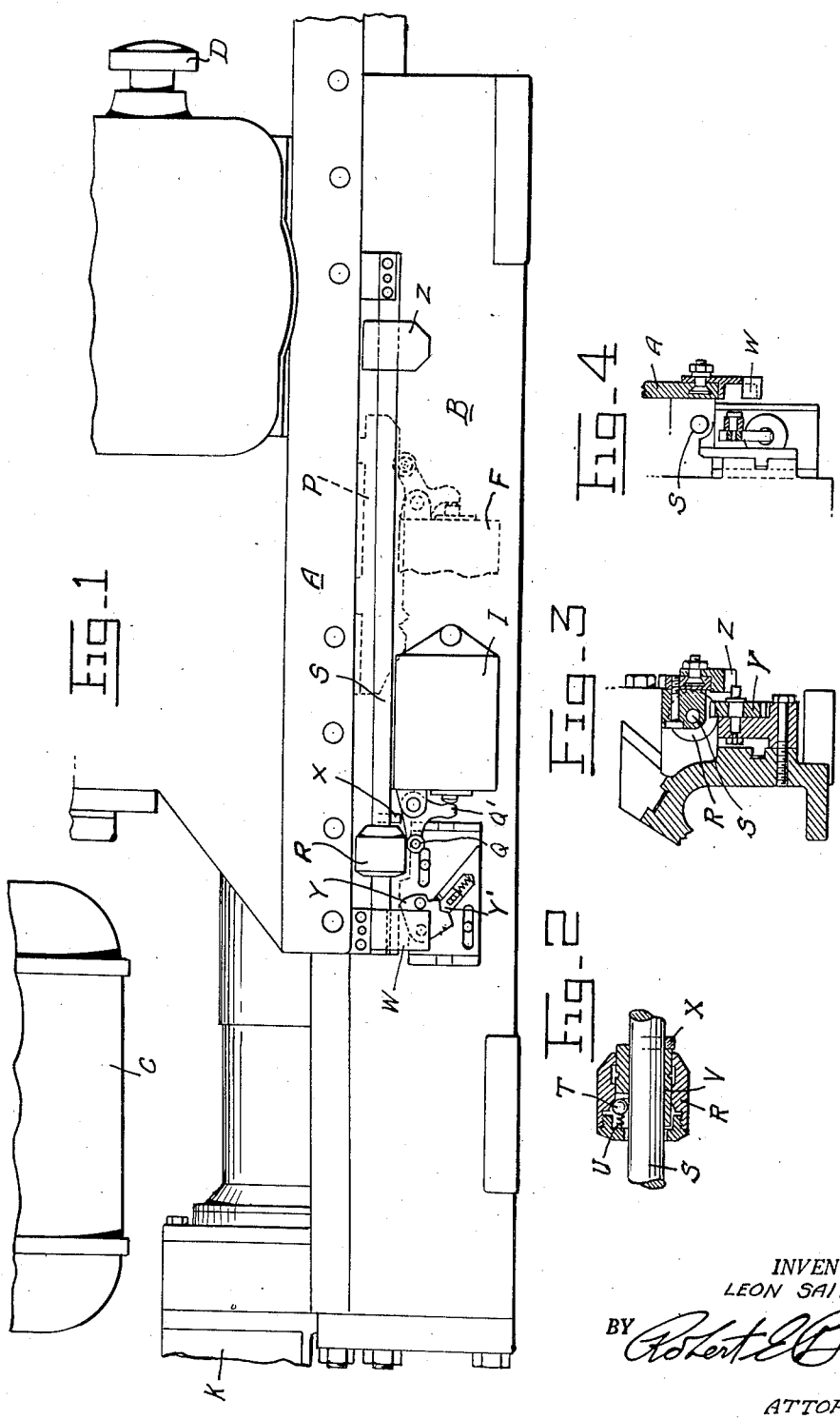
INVENTOR.
LEON SAIVES
BY Robert E. Burns
ATTORNEY

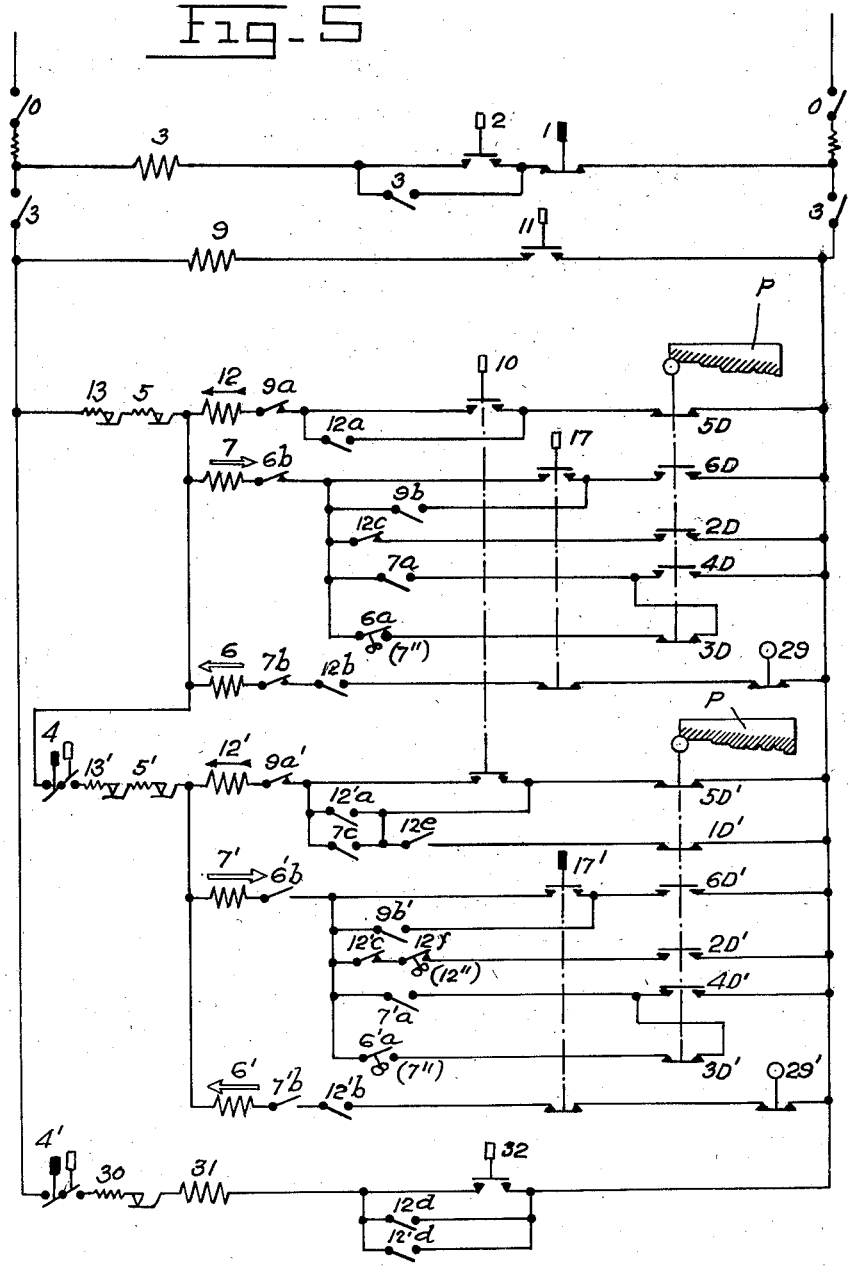

Patented Dec. 11, 1951

2,578,454

UNITED STATES PATENT OFFICE 2,578,454

DRILLING AND SWARF CLEARING DEVICE FOR MACHINE TOOLS

Léon Saives, Billancourt, France, assignor to Regie Nationale des Usines Renault, Billancourt, France Application January 6, 1948, Serial No. 784
In France January 24, 1947

5 Claims. (Cl. 77—32.3)

1

This invention relates to improvements in machine tools and concerns more particularly a drilling and swarf clearing device for an automatic head for machine tools.

The drilling and swarf clearing system according to the invention has the object of carrying out drilling work with a succession of swarf clearing operations automatically controlled by a cam, the recoil of the head and the return thereof to the most forward position previously reached being effected at high speed.

According to the invention, this result is obtained in particular by means of a special cam driven by a rod connected to the head and controlling the forwardmost position reached by the head at the moment when the swarf clearing is controlled by a cam connected to the movable tool-supporting frame and acting on a suitable electric distributor, in particular the electric distributor forming the subject matter of my copending application Serial No. 783, filed January 6, 1948, now abandoned.

According to a further feature of the invention, the cam connected to the head comprises a succession of inclined faces separated by recesses, and an electric system in provided which comprises a time limit device which only permits the swarf clearing operation to be carried out when it could be brought about only by the following inclined face of the cam.

According to a further feature, the cam controlling the most advanced position is automatically displaced at the end of the operation and during the return to a suitable initial position. More particularly, this cam is constituted by a conical element which is carried on a rod integral with the tool-supporting frame and held fast therein by balls which are under the action of springs and act between the rod and internal conical inclined faces of this element. In addition, a sleeve driven by the conical element and disposed inside the said conical element concentrically with respect to the rod is arranged to force back the balls and the springs and to free the cam so that the translational movement thereof is stopped, when the said sleeve abuts against an adjustable angle piece, suitably secured to the fixed slide on which the tool-supporting frame is movably mounted.

Finally, in order to return the conical cam to its initial position at the end of the drilling operation, a pawl is mounted on the fixed slide and is adapted to be released in a suitable manner at this instant, the said pawl retaining the conical cam. The conical cam then slides on a

2 driving rod until a counter-cam lowers the pawl, whereby the conical cam is again held fast on the driving rod.

The invention will now be described in greater detail with reference to the accompanying drawings which show, by way of example, an embodiment of the invention and in which:

Figure 1 is a side elevational view of a machine embodying features of the present invention;

Figure 2 is a sectional view showing details of the cam R;

Figure 3 is a sectional view showing the relative positioning of the arm Z;

Figure 4 is a similar view of the arm W, and

Figure 5 shows the distribution diagram of an electro-mechanical head comprising a drilling and swarf clearing system according to the invention and an electric distributor of the type forming the subject of my copending application No. 783, filed January 6, 1948, now abandoned.

Figure 1 shows an electro-mechanical head, the movable tool-supporting frame of which has rapid and slow movements imparted to it by two different motors, which frame supports longitudinally a device according to the invention. The machine illustrated in Fig. 1 comprises a fixed bed B, a movable frame A mounted for reciprocating movement on the bed B, a slow feed motor C and a rapid approach motor K. The tool driven by the machine is mounted in the spindle D which is connected to slow feed motor C by any convenient gearing arrangement. The machine of the invention is a step drilling machine and is characterized by two cams which engage switch means for controlling the movements of the tool carrying frame A by controlling the rapid approach motor K and the slow feed motor C. These two cams are designated R and P in the drawing. For convenience, the cam R is carried on one side of the machine and the cam P on the other, although other arrangements of the cams may be made. The cam R is carried on a rod S which is rigidly attached to the movable frame A of the machine. Cam R is frictionally held is position by balls T which are urged by a spring U against an inner inclined face of the cam R. X is a fixed stop mounted on the bed B of the machine. I designates a switch which controls the energization of rapid approach motor K. The switch I is actuated by a lever Q, Q'. Engagement of the lever arm Q by the cam R shuts off rapid approach motor K and the spindle-carrying movable frame A moves forward under the action only of slow feed motor C. Thus, when the drilling operation begins, the movable frame A moves toward the right as viewed in Fig. 1 under the action of both motor K and motor C. When the cam R reaches the lever arm Q, it depresses it and makes contact with switch I, shutting off rapid approach motor K. At the same time in engages a fixed stop mounted upon the bed B which pushes against sleeve V and permits the cam R to slide on rod S. The cam R thereby remains in the same position against fixed stop X as the rod S goes through it with the forward movement of the movable frame A. At this point the cam P which, as mentioned, is also mounted on the movable frame A, but conveniently on the side opposite cam R, engages and operates a distributor F to control the step drilling operation. The distributor F, which cam P engages, and which controls the extent of each drilling step, is conveniently that disclosed in applicant's application, Serial No. 783 referred to above, now abandoned.

The circuits controlled by the distributor in the embodiment of the machine of the invention which is illustrated in the drawing are shown in detail in Fig. 5. The first face of the cam P determines the extent of the first drilling step. At the end of the first step the rapid approach motor K is reversed by the action of the distributor and rapid withdrawal of the drill takes place. As the movable frame A starts back, cam R is released from stop X and frictionally grips rod S thereby indicating the forwardmost point reached by the drill in the first step. Rapid return of the drill is stopped by the cam P as it moves rearwardly with the movable frame A and opens a contact energizing the motor K in the forward direction. The tool then starts to advance rapidly until rapid advance is stopped by engagement by the cam R of the lever arm Q which makes contact with switch I. The cam R measures the forwardmost distance reached by the drill in the previous step and thus permits rapid approach substantially to the point of the engagement with the work, then shuts off the rapid approach motor and permits the drilling to be carried out under the action only of the slow feed motor. The cam R is displaced a proportional amount during each step along the rod S. The next step of the drilling is then controlled by the second face of the cam P and so on until the drilling operation is completed.

The machine of the invention is also characterized by means for resetting the cam R at the end of the drilling operation. The resetting means includes an arm W carried by the movable frame A (Fig. 4), an arm Z also carried by the movable frame A, and a pivoted stop member Y having two recesses engageable by a spring-pressed pawl Y'. When the movable frame A reaches its forwardmost position, the arm W engages the pivoted stop member Y and moves it upwardly into the path of the cam R, i. e. into the position shown in Fig. 1. As the frame A moves rearwardly the cam R engages pivoted stop member Y and is caused to slide to the right along rod S so that it is displaced toward the forward end of the frame A. The arm Z which, as mentioned, is also carried by the movable frame A, then engages stop member Y as shown in Fig. 3 and moves it downwardly out of the path of cam R. The cam R is then free to travel with the rod S and is placed in position for the first forward drilling movement of the machine in the next operation.

There will now be described by way of practical example, the electric distribution scheme of an electro-mechanical head comprising a drilling and swarf clearing system according to the invention and also provided with an electric distributor of the type forming the subject of application No. 783, filed January 6, 1948, now abandoned.

(A) INOPERATIVE POSITION

The knife switches O are closed, the temporary depression of the button 2 has closed the contacts 3, and the contacts 5D, 6D, 4D and 3D are as shown in the diagram, while the contact 29 is closed.

(B) STARTING

The button 10 is depressed. The relay 12 is energized, and the motor C and the spindle D rotate and the slow feed commences. The holding contact 12A short-circuits the button 10.

(C) WORKING CYCLE (1) *Rapid approach*

The blade 12b is closed at the same time as 12a. The relay 6 is energized and the motor K rotates.

(2) *End of the first rapid approach*

The contact 29 is opened by the conical cam R. The relay 6 is de-energized and the motor K is stopped.

(3) *Slow feed*

The relay 12 continues to be energized and the motor C rotates and the frame A advances slowly.

The rod S drives the cam R until the sleeve V abuts against the angle piece X and forces the balls T and the springs U back, thus freeing the cam R, the translational movement of which is stopped while the translational movement of the frame A and of the rod S continues (Figure 1).

(4) *Swarf clearance*

The contact 3d in closing will energize the relay 7, which will be held by the blade 7a. The motor K commences its rapid return motion until the contact 4d opens. This is the position at the end of the swarf clearance operation.

The blade 7b which was opened during the rapid return closes. The head again starts to advance rapidly, which movement will be stopped by the cam R. This cam controls the forwardmost point reached by the head. Owing to the adjustable interval between the opening of the contact 29 by the cam and the point where this cam is retained by the angle piece X, it is possible to compensate for the start on the rapid feed and to provide a suitable clearance to prevent engagement with the work-piece during the rapid feed. Since the time limit of the time switch 6A is longer than the time required to negotiate a recess on the cam, it is when the following recess is negotiated that the swarf clearance will again be started.

(5) *End of drilling*

After the last swarf clearance, a cam W causes the pawl Y to project. At the end of the operation, the contact 5d is opened, the relay 12 is de-energized and the blade 12c closes. The relay 7 is energized and the rapid return will take place until the end of the normal cycle: opening of the contact 2d.

During the return of the frame A, the pawl Y retains the cam R, which slides on the rod S, whereafter the counter-cam Z lowers the pawl X, which releases the cam R at the point where it will act on the contact 29 at the first rapid approach of the following operation.

(D) MANUAL OPERATION

*(1) Stoppage during work*

Temporary depression of the button 1 de-energizes the relay 3 and stops the two motors C and K.

*(2) Resumption of work*

Temporary depression of the button 2 energizes the relay 3, which is held.

The head starts its rearward movement, the blades 12c and 2D being in series. The slow feed is immediately re-started by depression 10. 12c opens. The rapid return continues, maintained by 7a. A swarf clearing operation has been added.

*(3) Swarf clearance*

Temporary depression of the button 17 produces the de-energization of the relay 6 and the energization of the relay 7. The energization of the relay 7 causes it to be held by the blade 7a and produces the rapid return of the frame A. At the end of the rapid return, the rapid feed is recommenced and stopped as for the automatic swarf clearance.

*(4) Return to the inoperative position*

Temporary depression of the button 11 causes the energization of the relay 7 and the de-energization of the relay 12, which can only be re-energized by 10. The return therefore stops at the normal position: opening of the contact 2D.

*(5) Supplementary return*

If the button 11 is held in the depressed position, the return continues until the contact 6D is opened.

I claim:

1. In a drilling machine for effecting a drilling operation with a succession of swarf clearing steps and having tool head means mounted for translational movement over a base, a first electric motor for imparting rapid translational movements to said head with respect to said base, a second electric motor for imparting slow translational movements to said head with respect to said base, and electrical circuits therefor, in combination, switch means in said circuits for de-energizing said first electric motor at the end of a predetermined forward movement of said tool head, an electrical distributor connected in said circuits for determining the periods of energization of said second motor to control the successive electric swarf clearing movements of said tool head and the reverse actuation of said first motor for the rapid return of said tool head between each of said movements, means for actuating said switch means comprising a rod carried by said head, a cam supported on said rod, means releasably locking said cam to said rod, means for releasing said locking means upon engagement therewith, said cam being slidable on said rod during forward drilling movement of said head, said cam being arranged to engage said switch means for de-energizing said first motor when said head has reached a predetermined variable forward position, and a second cam engageable with contact means on said distributor for controlling the successive swarf clearing movements of the machine and the rapid return of the tool head after each swarf clearing movement, said first cam indicating the forwardmost position reached by said tool head during each swarf clearing movement and establishing the end point of the rapid approach of the tool head at the beginning of each swarf clearing movement.

2. A device according to claim 1 wherein said locking means for said cam includes a sleeve on said rod and spring means between said sleeve and said cam, said cam stop means including a fixedly secured member for acting on said sleeve thereby releasing said cam and stopping the transational movement thereof while permitting said cam to slide on said rod for a given distance.

3. A device according to claim 2, including a pawl normally inoperative, situated to engage said locked cam for effecting a restoration thereif, means to render effective said pawl upon completion of the working stroke of said tool head, and means to render inoperative said pawl upon completion of the return stroke of said tool head.

4. A device according to claim 1, wherein said second cam includes a plurality of inclined faces and recesses and is associated with said tool head for movement therewith and positioned to coact with said control portion of said electrical circuit.

5. A device according to claim 4, further including in said electrical circuit a time switch having a working period related to the dimensions of said recesses.

LÉON SAIVES.

REFERENCES CITED

The following references are of record in the file of this patent:

UNITED STATES PATENTS

| Number | Name | Date |
| --- | --- | --- |
| 2,053,398 | Kingsbury | Sept. 8, 1936 |
| 2,324,727 | Shartle | July 20, 1943 |